US012627173B2

(12) United States Patent
Kim et al.

(10) Patent No.: US 12,627,173 B2
(45) Date of Patent: May 12, 2026

(54) WIRELESS POWER TRANSMITTING DEVICE AND WIRELESS POWER TRANSMITTING SYSTEM INCLUDING AMPLIFIER HAVING CONTROLLED POWER VOLTAGE

(71) Applicant: SAMSUNG ELECTRONICS CO., LTD., Suwon-si (KR)

(72) Inventors: Dohyung Kim, Suwon-si (KR); Jaesup Lee, Suwon-si (KR); Solhee In, Suwon-si (KR); Byungwook Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 18/733,577

(22) Filed: Jun. 4, 2024

(65) Prior Publication Data

US 2025/0079905 A1 Mar. 6, 2025

(30) Foreign Application Priority Data

Sep. 6, 2023 (KR) ......................... 10-2023-0118162

(51) Int. Cl.
H02J 50/23 (2016.01)
H02J 50/40 (2016.01)

(52) U.S. Cl.
CPC ............ H02J 50/23 (2016.02); H02J 50/402 (2020.01)

(58) Field of Classification Search
CPC ........................... H02J 50/20–23; H02J 50/402
See application file for complete search history.

(56) References Cited

U.S. PATENT DOCUMENTS

| | | | |
|---|---|---|---|
| 10,320,242 B2 | 6/2019 | Hajimiri et al. | |
| 10,516,302 B2 | 12/2019 | Lee et al. | |
| 2010/0181961 A1* | 7/2010 | Novak | H04W 52/04 |
| | | | 320/108 |
| 2012/0326660 A1 | 12/2012 | Lu et al. | |

(Continued)

FOREIGN PATENT DOCUMENTS

| | | | | |
|---|---|---|---|---|
| CN | 111934446 A | 11/2020 | | |
| CN | 113364474 B | * 10/2022 | ............... | H04B 1/04 |
| KR | 10-2018-0124783 A | 11/2018 | | |

OTHER PUBLICATIONS

English machine translation of CN113364474B published Oct. 14, 2022 (Year: 2022).*

(Continued)

*Primary Examiner* — Daniel Cavallari
*Assistant Examiner* — David A Shiao
(74) *Attorney, Agent, or Firm* — Sughrue Mion, PLLC

(57) ABSTRACT

Provided is a wireless power transmitting system and device, the wireless power transmitting device including: a signal generator configured to generate an initial signal; a controller configured to output an amplitude control signal and a phase control signal; a phase modulator configured to generate a phase-modulated signal by modulating a phase of the initial signal based on the phase control signal; a power amplifier configured to generate a power signal by amplifying the phase-modulated signal; a voltage converter configured to control a magnitude of a power voltage of the power amplifier based on the amplitude control signal; and an antenna configured to externally output the power signal.

19 Claims, 8 Drawing Sheets

(56)         References Cited

U.S. PATENT DOCUMENTS

| | | | |
|---|---|---|---|
| 2015/0130293 A1* | 5/2015 | Hajimiri | H01Q 21/225 |
| | | | 307/104 |
| 2016/0227483 A1* | 8/2016 | Wang | H04B 1/0475 |
| 2017/0302109 A1* | 10/2017 | Lee | H02J 50/23 |
| 2018/0254671 A1* | 9/2018 | Murata | H04W 52/42 |
| 2018/0301940 A1* | 10/2018 | Yeo | H02J 50/60 |
| 2019/0140766 A1 | 5/2019 | Anlage et al. | |
| 2020/0067187 A1* | 2/2020 | Reynolds | B64F 1/362 |
| 2020/0328623 A1* | 10/2020 | Kimball | H02J 50/23 |
| 2021/0210984 A1* | 7/2021 | Peralta | H02J 50/005 |
| 2023/0412005 A1* | 12/2023 | Mitomo | H02J 50/27 |

OTHER PUBLICATIONS

Hajimiri et al., "Dynamic Focusing of Large Arrays for Wireless Power Transfer and Beyond", IEEE Journal of Solid-State Circuits, Jul. 2021, vol. 56, No. 7, pp. 2077-2101 (25 pages total).
Wang et al., "A 5.8 GHz Four-Channel RF Beamforming IC Based on a Vector Modulator for Wireless Power Transmission", IEEE Transactions on Circuits and Systems'II: Express Briefs, Mar. 2022, vol. 69, No. 3, pp. 709-713 (5 pages total).

* cited by examiner

30

WIRELESS POWER TRANSMITTING DEVICE AND WIRELESS POWER TRANSMITTING SYSTEM INCLUDING AMPLIFIER HAVING CONTROLLED POWER VOLTAGE

CROSS-REFERENCE TO RELATED APPLICATIONS

This application claims benefit of priority to Korean Patent Application No. 10-2023-0118162 filed on Sep. 6, 2023, in the Korean Intellectual Property Office, the disclosure of which is incorporated herein by reference in its entirety.

BACKGROUND

1. Field

The present disclosure relates to a wireless power transmitting device and a wireless power transmitting system including the wireless power transmitting device.

2. Description of Related Art

A wireless power transmission technology which wirelessly transfers power to a receiving device, a method of transmitting power using an electric motor or a transformer using the principle of electromagnetic induction, and a method of transmitting power using electromagnetic waves such as radio waves and lasers, have been developed. Currently known wireless power transmission technologies include magnetic induction, magnetic resonance, and a long-distance transmission technology using short-wavelength radio frequencies.

In order to transfer power to the receiving device using the long-distance transmission technology using short-wavelength radio frequencies, a transmitting device for wireless communication may be used. However, the transmitting device for wireless communication may include complex circuits to transmit data streams at high speed, and accordingly, when the power is transferred to a transmitting device for wireless communication, power efficiency may decrease.

SUMMARY

An aspect of the present disclosure is to provide a wireless power transmitting device and a wireless power transmitting system that may reduce a size and reduce production costs by reducing circuit complexity.

Another aspect of the present disclosure is to provide a wireless power transmitting device and a wireless power transmitting system that may increase power efficiency for power signal transmission.

According to an aspect of the disclosure, a wireless power transmitting device includes: a signal generator configured to generate an initial signal; a controller configured to output an amplitude control signal and a phase control signal; a phase modulator configured to generate a phase-modulated signal by modulating a phase of the initial signal based on the phase control signal; a power amplifier configured to generate a power signal by amplifying the phase-modulated signal; a voltage converter configured to control a magnitude of a power voltage of the power amplifier based on the amplitude control signal; and an antenna configured to externally output the power signal.

According to an aspect of the disclosure, a wireless power transmitting device includes: a signal generator for generating an initial signal; a sensor configured to sense a phase and an amplitude of a beacon signal from a wireless power receiving device; a controller configured to output an amplitude control signal and a phase control signal based on the phase and the amplitude of the beacon signal; a phase modulator configured to generate a phase-modulated signal by modulating a phase of the initial signal based on the phase control signal; a power amplifier configured to generate a power signal by amplifying the phase-modulated signal; a voltage converter configured to control a magnitude of a power voltage of the power amplifier based on the amplitude control signal; and one or more antennas configured to receive the beacon signal and to transmit the power signal to the wireless power receiving device.

According to an aspect of the disclosure, a wireless power transmitting system includes: an antenna array including a plurality of antenna elements each respectively configured to output a power signal; and a plurality of wireless power transmitting devices connected to each of the plurality of antenna elements, wherein each of the plurality of wireless power transmitting devices includes: a signal generator configured to generate an initial signal; a controller configured to output an amplitude control signal and a phase control signal; a phase modulator configured to generate a phase-modulated signal by modulating a phase of the initial signal based on the phase control signal; a power amplifier configured to generate the power signal by amplifying the phase-modulated signal; and a voltage converter configured to control a magnitude of a power voltage of the power amplifier based on the amplitude control signal.

In a wireless power transmitting device according to an example embodiment of the present disclosure, since the complexity of a circuit controlling a phase and an amplitude of an initial signal can be reduced, a size of the wireless power transmitting device may be reduced and production costs may be reduced.

A wireless power transmitting device according to an example embodiment of the present disclosure may modulate a phase of a power signal by controlling a magnitude of a power voltage of a power amplifier, thereby increasing power efficiency.

The present disclosure is not limited to the above-mentioned aspects, and other aspects not mentioned herein will be clearly understood by those skilled in the art from the following description.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
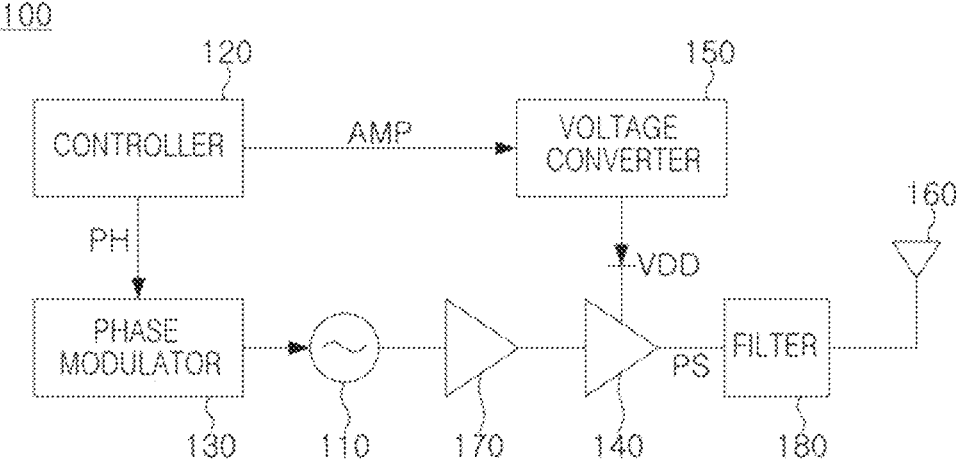
FIG. 1 is a view illustrating a wireless power transmitting device according to an example embodiment of the present disclosure.

Hereinafter, example embodiments of the present disclosure will be described with reference to the accompanying drawings. In the following description, like reference numerals refer to like elements throughout the specification.

As used herein, a plurality of "units", "modules", "members", and "blocks" may be implemented as a single component, or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Herein, the expressions "at least one of a, b or c" and "at least one of a, b and c" indicate "only a," "only b," "only c," "both a and b," "both a and c," "both b and c," and "all of a, b, and c."

It will be understood that, although the terms first, second, third, etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

FIG. 1 is a view illustrating a wireless power transmitting device according to an example embodiment of the present disclosure.

A wireless power transmitting device 100 may wirelessly transmit electrical energy to a receiving device using a power signal (PS) having a predetermined frequency. The wireless power transmitting device 100 may be capable of transmitting power over a long distance or to moving targets (i.e., the wireless power transmitting device 100 may provide "power on the move").

Referring to FIG. 1, the wireless power transmitting device 100 may include a signal generator 110, a controller 120, a phase modulator 130, a power amplifier 140, a voltage converter 150, and an antenna 160. According to an example embodiment, the wireless power transmitting device 100 may further include a driving amplifier 170 and a filter 180.

The signal generator 110 may generate an initial signal. For example, the initial signal may be an alternating current (AC) power signal having a constant amplitude and a phase. The initial signal may include electromagnetic waves in various frequency ranges. For example, the initial signal may be an electromagnetic wave included in a radio frequency range or a microwave frequency range. A radio frequency or a microwave frequency may reduce interference with other communication devices. For example, a frequency in the Industrial Scientific Medical (ISM) band may be used as an initial signal.

For example, the signal generator 110 may include a power inverter for converting a direct current (DC) power signal to an AC power signal. The signal generator 110 may receive the DC power signal from a battery in the wireless power transmitter 100 or from the outside. It will be understood by those skilled in the art that there is no limitation as long as the signal generation unit 110 may provide an AC power signal.

The controller 120 may generally control the wireless power transmitting device 100 to generate a power signal PS by adjusting an amplitude and a phase of the initial signal of the signal generator 110. For example, the controller 120 may determine a target phase and a target amplitude of the power signal PS, in which the transmission efficiency of the power signal PS transmitted to the receiving device may be improved. In addition, the controller 120 may output an amplitude control signal (AMP) and a phase control signal (PH) so that the initial signal may be modulated based on the target phase and the target amplitude.

The phase modulator 130 may generate a phase-modulated signal by adjusting a phase of a signal generated by the signal generator 110. In an example of FIG. 1, the phase modulator 130 may be connected to an input terminal of the signal generator 110 to control the signal generator 110 to output the phase-modulated signal. However, the present disclosure is not limited thereto, and the phase modulator 130 may be connected to an output terminal of the signal generator 110 to modulate a phase of the initial signal output from the signal generator 110.

The phase modulator 130 may determine a phase offset based on an analog signal or a digital signal, and may generate a phase-modulated signal by modulating the phase of the initial signal by the phase offset. That is, an amplitude control signal AMP may be an analog signal or a digital signal according to implementation. The phase modulator 130 may include a resistive phase modulation circuit and a digital phase modulation circuit.

For example, when the phase modulator 130 is the resistive phase modulation circuit, the phase modulator 130 may include a resistance network. A multi-phase clock signal generated based on the initial signal may be input to the resistance network, and a current flowing through the resistor network may be controlled based on the digital signal. The resistor network may output the phase-modulated signal having a phase corresponding to the digital signal, depending on the current.

The power amplifier 140 may output a power signal PS by amplifying power of the phase-modulated signal. A power voltage VDD may be applied to the power amplifier 140 so that the power amplifier 140 may operate. The power efficiency of the power amplifier 140 may vary, according to the power of the power signal PS output from the power amplifier 140. For example, in a case in which a power voltage VDD having a fixed value is applied to the power amplifier 140, when the power amplifier 140 outputs a power signal PS having a relatively low amplitude, the efficiency of output power may be reduced as compared to the input power of the power amplifier 140.

According to an example embodiment of the present disclosure, the voltage converter 150 may adjust the power voltage VDD according to the target amplitude of the power signal PS. For example, the controller 120 may output an amplitude control signal AMP determined according to the target amplitude of the power signal PS, and the voltage converter 150 may adjust a magnitude of the power voltage VDD based on the amplitude control signal AMP. Furthermore, the voltage converter 150 may stabilize the output voltage based on the amplitude control signal AMP and may supply the output voltage as a power voltage VDD of the power amplifier 140.

The antenna 160 may externally output the power signal PS. According to an example embodiment, the antenna 160 may include a plurality of antenna elements, and the plurality of antenna elements may provide the power signal PS to a wireless communication receiving device using beamforming. However, the present disclosure is not limited thereto.

The wireless power transmitting device 100 may further include a driving amplifier 170 connected to an input terminal of the power amplifier 140. When the wireless power transmitting device 110 includes the driving amplifier, the driving amplifier may amplify the phase-modulated signal and provide the power amplifier 140 with the amplified signal. In order to provide integrity of the power signal PS output from the power amplifier 140, the driving amplifier 170 may be designed to have a higher gain than the power amplifier 140. For example, a power voltage having a greater magnitude than the power voltage VDD may be applied to the driving amplifier 170.

The wireless power transmitting device 100 may further include a filter 180 connected to the output terminal of the power amplifier 140. The filter 180 may remove noise from the power signal PS, and provide the power signal from which the noise is removed to the antenna 160. For example, the filter 180 may include a band pass filter to selectively pass a predetermined range of a frequency of the power signal PS. According to an example embodiment, the wireless power transmitting device 100 may further include a switch between the power amplifier 140 and the antenna 160.

While a transmitting device for wireless communication may also be used to generate a power signal by modulating the phase and the amplitude of the initial signal, the transmitting device for wireless communication may be required to quickly change the phase and the amplitude of the initial signal in order to output a data signal corresponding to a data stream that changes at high speed. Accordingly, general transmitting devices for wireless communication may include a digital-to-analog converter (DAC) having a complex structure, a variable gain amplifier (VGA), and a mixer. Accordingly, transmission of power using the transmitting device for wireless communication may cause high power loss, and the size of the wireless power transmitting device using the transmitting device for wireless communication may be large and production costs may increase.

By comparison, since a power signal does not include data, even if the phase and the amplitude change late as compared to a data signal, the receiving device is less likely to exhibit an error based on a late change to the phase and/or amplitude. Accordingly, according to an example embodiment of the present disclosure, the wireless power transmitting device 100 may modulate the phase and the amplitude of the initial signal generated from the signal generator 110 using the phase modulator 130, the power amplifier 140, and the voltage converter 150, which may be implemented as a relatively simple circuit. Therefore, the size of the wireless power transmitting device 100 according to the example embodiment of the present disclosure may be reduced, production costs may be saved, and power efficiency may be increased.

Furthermore, according to an example embodiment of the present disclosure, the voltage converter 150 may determine the magnitude of the power voltage VDD based on an amplitude control signal AMP from the controller 120. Therefore, power consumption of the power amplifier 140 may be reduced, and the power efficiency of the wireless power transmitting device 100 may be further improved.

Hereinafter, an exemplary circuit structure of a voltage converter will be described with reference to FIGS. 2A, 2B, and 2C.

Figure 2A:
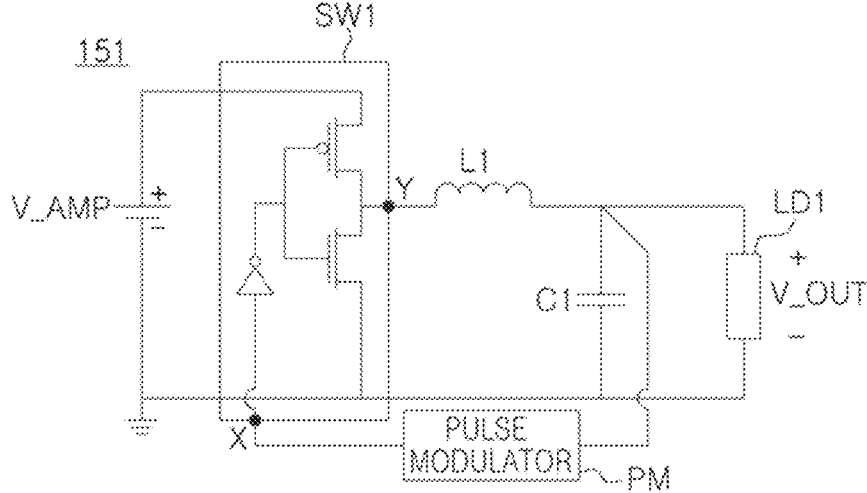
FIGS. 2A, 2B, and 2C are views illustrating a voltage converter according to an example embodiment of the present disclosure.
Figure 2B:
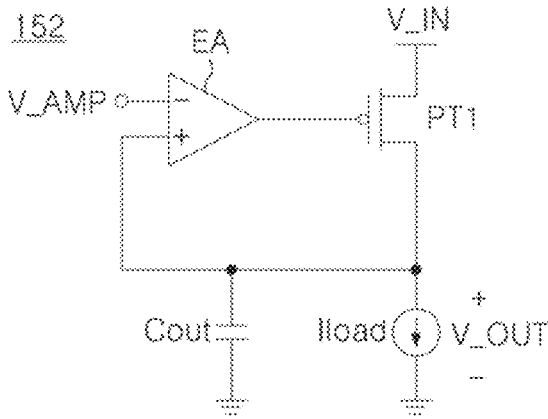
Figure 2C:
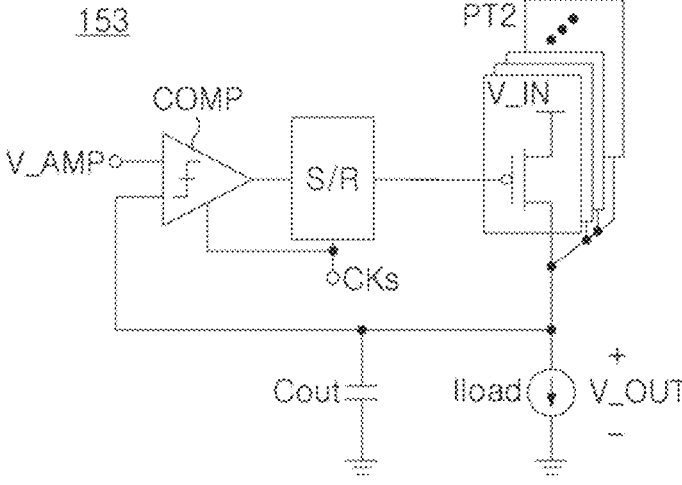

FIGS. 2A, 2B, and 2C are views illustrating a voltage converter according to an example embodiment of the present disclosure.

Referring to FIG. 2A, an example of a voltage converter 151 implemented with a variable DC-DC converter is illustrated. The voltage converter 151 may correspond to the voltage converter 150 described with reference to FIG. 1.

The voltage converter 151 may include an LC filter including an inductor L1 and a capacitor C1, a switch SW1, a pulse modulator PM, and a load LD1. An amplitude control voltage V_AMP corresponding to the amplitude control signal AMP described with reference to FIG. 1 may be applied to the voltage converter 151 as a power source.

The pulse modulator PM may be implemented as a pulse width modulator PWM or a pulse frequency modulator PFM. When the pulse modulator PM applies a pulse signal capable of repeating on/off of the switch SW1, an operation of connecting the amplitude control voltage V_AMP to the load LD while turning on the switch SW1 and an operation of disconnecting the amplitude control voltage V_AMP from the load LD while turning off the switch SW1 may be repeated periodically, and a pulse-shaped voltage may be smoothed through the LC filter to output an output voltage V_OUT. A magnitude of the output voltage V_OUT may vary, according to a magnitude of the amplitude control voltage V_AMP, and may be applied as the power voltage VDD of the power amplifier 140 described with reference to FIG. 1.

Referring to FIG. 2B, the voltage converter 152 implemented as an analog low-dropout (LDO) regulator is illustrated. The voltage converter 152 may correspond to the voltage converter 150 described with reference to FIG. 1.

The voltage converter 152 may include an error amplifier EA, a power transistor PT1, a load capacitor Cout, and a load current Iload. The amplitude control voltage V_AMP may be applied as a reference voltage of the error amplifier EA. The voltage converter 152 may sense a change in the load current Iload through the error amplifier EA and generate as much output current as necessary by controlling a gate voltage of the power transistor PT1.

An on/off operation of the power transistor PT1 may be repeated according to the comparison result between the output voltage V_OUT and the amplitude control voltage V_AMP, and an operation of connecting the input voltage V_IN and the load capacitor Cout to each other in an on state of the power transistor PT1 and an operation of disconnecting the input voltage V_IN and the load capacitor Cout in an off state of the power transistor PT1 may be repeated periodically. Accordingly, the output voltage V_OUT may vary, depending on the magnitude of the amplitude control voltage V_AMP, and the output voltage V_OUT may be applied as the power voltage VDD of the power amplifier 140 described with reference to FIG. 1.

Referring to FIG. 2C, a voltage converter 153 implemented as a digital LDO regulator is illustrated. The voltage converter 153 may correspond to the voltage converter 150 described with reference to FIG. 1.

The voltage converter 153 may include a comparator COMP, a shift register S/R, power transistors PT2, a load capacitor Cout, and a load current Iload.

The voltage converter 153 may sense a change in the load current Iload through the comparator COMP and may generate the output voltage V_OUT by turning on or off the power transistors PT2 one by one using the shift register S/R. The amplitude control voltage V_AMP may be applied as a reference voltage of the comparator COMP. The output voltage V_OUT may be applied as the power voltage VDD of the power amplifier 140 described with reference to FIG. 1.

A circuit structure of the voltage converter 150 is not limited to those described with reference to FIGS. 2A to 2C, and the voltage converter 150 may be implemented as a DC-DC converter and LDO regulator having various circuit structures. Furthermore, the voltage converter 150 may be implemented as a circuit receiving a digital signal, as well as the amplitude control voltage V_AMP as an analog signal, as an amplitude control signal.

Figure 3A:
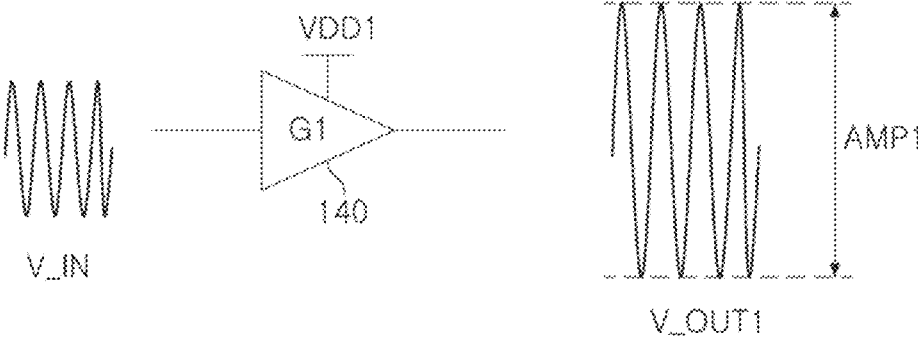
FIGS. 3A and 3B are views illustrating operations of a wireless power transmitting device according to an example embodiment of the present disclosure.
Figure 3B:

FIGS. 3A and 3B are views illustrating operations of a wireless power transmitting device according to an example embodiment of the present disclosure.

According to the description with reference to FIGS. 2A, 2B, and 2C, the voltage converter 150 may adjust the power voltage VDD applied to the power amplifier 140 based on the amplitude control signal.

FIG. 3A illustrates a case in which a first power voltage VDD1 is applied to the power amplifier 140, and FIG. 3B illustrates a case in which a second power voltage VDD2, lower than the first power voltage VDD1, is applied to the power amplifier 140.

Referring to FIG. 3A, a first power voltage VDD1 may be applied to the power amplifier 140, and the power amplifier 140 may be controlled to have a first gain G1. An input signal V_IN input to the power amplifier 140 may be amplified by the first gain G1 and may be output as a first output signal V_OUT1 having a first amplitude AMP1.

Referring to FIG. 3B, a second power voltage VDD2 may be applied to the power amplifier 140, and the power amplifier 140 may be controlled to have a second gain G2 lower than the first gain G1. The input signal V_IN input to the power amplifier 140 may be amplified by the second gain G2 and may be output as a second output signal V_OUT2 having a second amplitude AMP2 lower than the first amplitude AMP1.

The power efficiency of the power amplifier 140 may be determined as a ratio of an AC power of the output signal to a DC power of the power voltage. In a case where the second output signal V_OUT2 is generated by setting only a gain of the power amplifier 140 as the second gain G2 in a state in which the power voltage applied to the power amplifier 140 is fixed to the first power voltage VDD1, the power efficiency of the power amplifier 140 may be reduced since the DC power of the second power voltage VDD2 is lower than the DC power of the first power voltage VDD1.

According to an example embodiment of the present disclosure, the power efficiency of the power amplifier 140 may be improved by adjusting the power voltage together with the gain of the power amplifier 140 to adjust the amplitude of the output signal.

Figure 4:
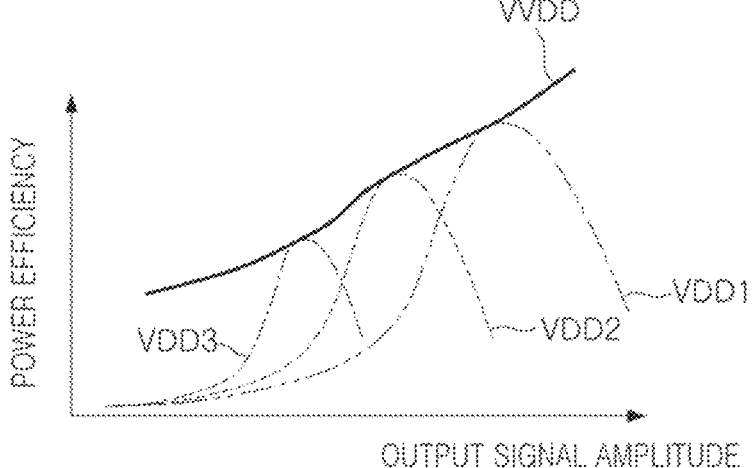
FIG. 4 is a graph illustrating power efficiency of a wireless power transmitting device according to an example embodiment of the present disclosure.

FIG. 4 is a graph illustrating power efficiency of a wireless power transmitting device according to an example embodiment of the present disclosure.

The graph of FIG. 4 illustrates the power efficiency of a power amplifier according to an amplitude of an output signal. The power efficiency as a function of the amplitude of the output signal may vary according to the power voltage of the power amplifier. FIG. 4 illustrates power efficiency when the power voltage of the power amplifier is a first power voltage VDD1, a second power voltage VDD2, and a third power voltage VDD3.

A power efficiency graph according to the amplitude of the output signal in a state in which the power voltage of the power amplifier is fixed may have a peak. For example, when the amplitude of the output signal has a maximum amplitude determined based on the power voltage, the power efficiency according to the amplitude of the output signal may be maximized.

According to an example embodiment of the present disclosure, a variable power voltage VVDD, determined based on a target amplitude of a power signal, may be applied to the power amplifier of the wireless power transmitting device. For example, the variable power voltage VVDD may be determined as a voltage having a maximum power efficiency with respect to the target amplitude. FIG. 4 illustrates power efficiency according to the amplitude of the output signal when the power voltage of the power amplifier is a variable power voltage VVDD.

According to an example embodiment of the present disclosure, the controller 120 described with reference to FIG. 1 may output an amplitude control signal AMP for controlling a magnitude of the variable power voltage VVDD so that the power efficiency for a target amplitude of a power signal PS has a maximum value. In other words, the controller 120 may output the amplitude control signal AMP for controlling the magnitude of the variable power voltage VVDD so that the target amplitude of the power signal PS is equal to a maximum amplitude of the output signal of the power amplifier 140.

According to an example embodiment of the present disclosure, when a variable power voltage VVDD is applied to the power amplifier, the power efficiency at a target amplitude of the output signal may be maximized. Accordingly, the power efficiency for power signal transmission may be improved.

Various algorithms may be applied to determine an amplitude and a phase of a power signal output from the wireless power transmitting device. For example, the wireless power transmitting device may determine the amplitude and the phase of the power signal based on a beacon signal received from the wireless power receiving device. Hereinafter, a wireless power transmitting device for determining an amplitude and a phase of a power signal based on the beacon signal will be described in detail with reference to FIG. 5.

Figure 5:
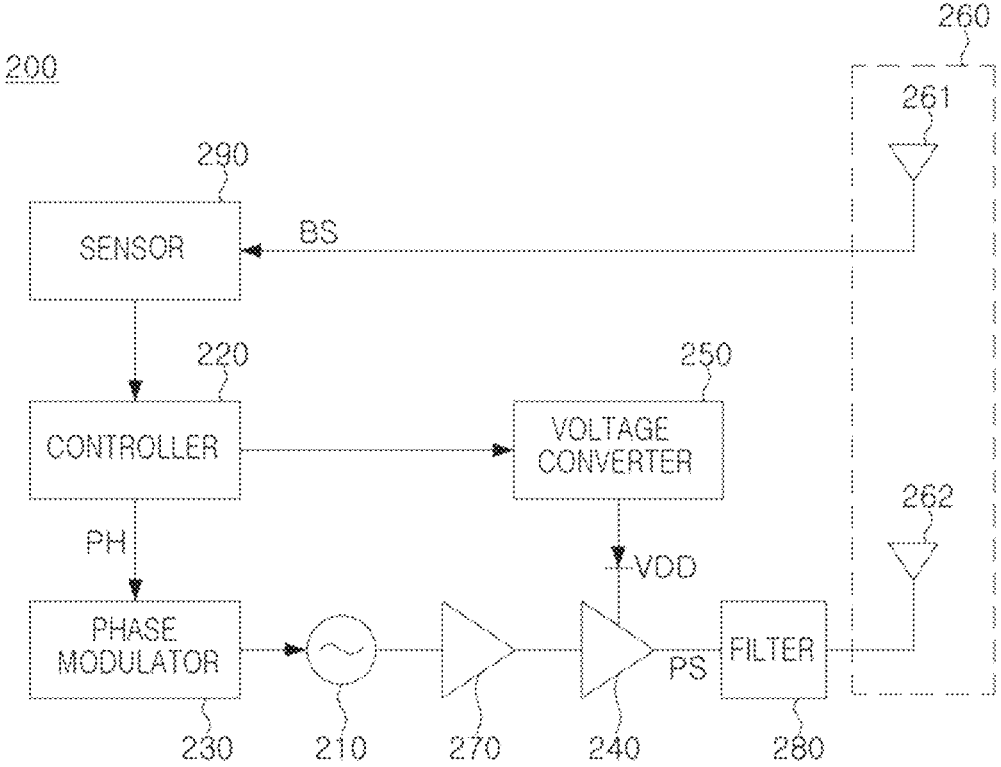
FIG. 5 is a view illustrating a wireless power transmitting device according to an example embodiment of the present disclosure.

FIG. 5 is a view illustrating a wireless power transmitting device according to an example embodiment of the present disclosure.

Referring to FIG. 5, a wireless power transmitting device 200 may include a signal generator 210, a controller 220, a phase modulator 230, a power amplifier 240, a voltage converter 250, an antenna 260, and a sensor 290. According to an example embodiment, the wireless power transmitting device 200 may further include a driving amplifier 270 and a filter 280.

The signal generator 210, the controller 220, the phase modulator 230, the power amplifier 240, the voltage converter 250, the driving amplifier 270, and the filter 280 may have a structure substantially the same as that of the signal generator 110, the controller 120, the phase modulator 130, the power amplifier 140, the voltage converter 150, the driving amplifier 170, and the filter 180 described with reference to FIG. 1. Hereinafter, the wireless power transmitting device 200 of FIG. 5 will be described by focusing on the difference from the wireless power transmitting device 100 described with reference to FIG. 1.

In order to increase the transmission efficiency of the power signal PS, the wireless power transmitting device 200 may receive a beacon signal BS from a wireless power receiving device, and modulate the power signal PS by analyzing the received beacon signal BS. For example, the wireless power transmitting device 200 may modulate a phase of an initial signal to have a phase that has been time-reversed from a phase of the beacon signal BS, and transmit the power signal PS generated by amplifying an amplitude of the phase-modulated signal to a wireless power receiving device.

The beacon signal BS may refer to a signal transmitted by the wireless power receiving device so as to enable the wireless power receiving device to transmit or receive power to or from the wireless power transmitting device 200. In order for the wireless power transmitting device 200 to transmit the power signal PS corresponding to the beacon signal BS, synchronization of both devices by the beacon signal BS may have to occur prior to transmitting the power signal.

The beacon signal BS may be transmitted along all possible paths between the wireless power receiving device and the wireless power transmitting device 200. For example, the beacon signal BS may be transmitted directly between the wireless power receiving device and the wireless power transmitting device 200, but may be reflected, diffracted, or refracted and transmitted indirectly therebetween.

Figure 6:
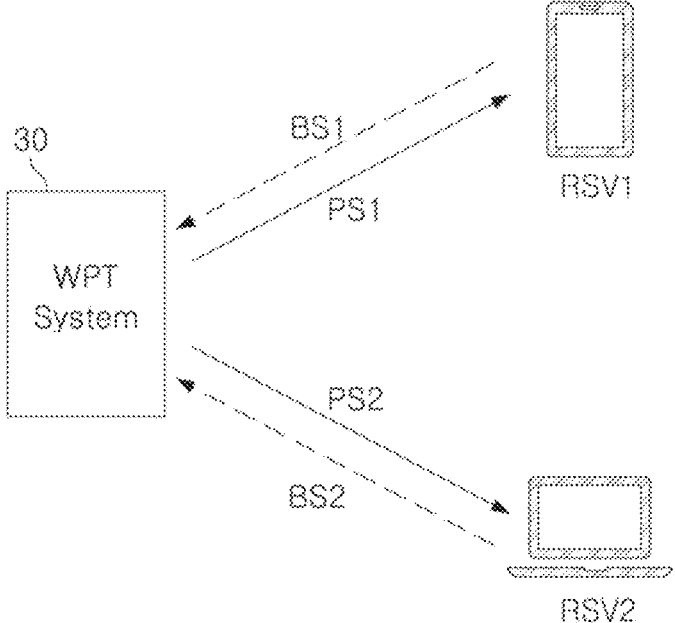
FIG. 6 is a view illustrating a wireless power transmitting system according to an example embodiment of the present disclosure.

The antenna 260 may include a plurality of antenna elements 261 and 262. In the embodiment of FIG. 6, a first antenna element 261 may be connected to the sensor 290, and a second antenna element 262 may be connected to the power amplifier 240. However, the present disclosure is not limited thereto, and one or more antenna elements included in the antenna 260 may be connected to each of the sensor 290 and the power amplifier 240.

The sensor 290 may sense a phase and an amplitude of the beacon signal BS. The sensor 290 may transmit the sensed phase and the sensed amplitude to the controller 220. For example, the sensor 290 may include a phase sensor for sensing the phase of the beacon signal BS and an amplitude sensor for sensing the amplitude. For example, the amplitude sensor may include an analog to digital converter for converting an amplitude of the beacon signal BS received from the first antenna element 261 to a digital signal. The phase sensor may include a phased locked loop or a digital phase detector for detecting the beacon signal BS, and outputting the detected phase to a digital signal.

The controller 220 may calculate phase time reversal based on the phase of the beacon signal BS received from the sensor 290, and may output a phase control signal PH based on calculation results. Furthermore, the controller 220 may determine an amplitude of the power signal PS based on the amplitude of the beacon signal BS received from the sensor 290, and may output an amplitude control signal AMP according to the determined amplitude.

According to an example embodiment, the amplitude of the power signal PS may be determined as a value that increases as the amplitude of the beacon signal BS increases.

The amplitude of the beacon signal BS may vary over time due to a movement of a relative position of the wireless power receiving device with respect to the wireless power transmitting device 200. The wireless power transmitting device 200 may change the amplitude of the power signal PS over time to efficiently provide power to a wireless power receiving device.

According to an example embodiment of the present disclosure, the controller 220 may output an amplitude control signal AMP varying according to the amplitude of the beacon signal BS, and the voltage converter 250 may increase the power efficiency of the power amplifier 240 by adjusting the power voltage VDD of the power amplifier 240 based on the amplitude control signal AMP. Accordingly, the wireless power transmitting device 200 may improve power efficiency in response to a target amplitude of the power signal PS that changes over time.

A wireless power transmitting system including a plurality of wireless power transmitting devices may be configured to deliver power to one or more wireless power receiving devices. For example, the wireless power transmitting system may amplify the power transmitted to the receiving device by allowing the plurality of wireless power transmitting devices to transmit power signals to one wireless power receiving device.

FIG. 6 is a view illustrating a wireless power transmitting system according to an example embodiment of the present disclosure.

A wireless power transmitting (WPT) system 30 may transmit power signals PS1 and PS2 to a plurality of wireless power receiving devices RSV1 and RSV2.

For example, each of the wireless power receiving devices RSV1 and RSV2 may be a television, a smartphone, a tablet computer, a laptop computer, a desktop computer, an access point (AP), a remote control device, a set-top box, consumer electronics, a personal digital assistant (PDA), or a wearable device. FIG. 6 illustrates a case in which a first wireless power receiving device RSV1 is a smartphone and a second wireless power receiving device RSV2 is a laptop computer. However, the present disclosure is not limited thereto.

The wireless power transmitting system 30 may include a plurality of wireless power transmitting devices each having an antenna, and power may be transmitted to the wireless power receiving devices RSV1 and RSV2 using each antenna.

Figure 7A:
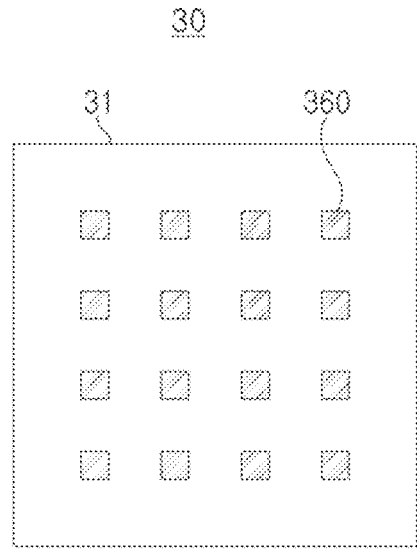
FIGS. 7A and 7B are views illustrating a wireless power transmitting system according to an example embodiment of the present disclosure.
Figure 7B:
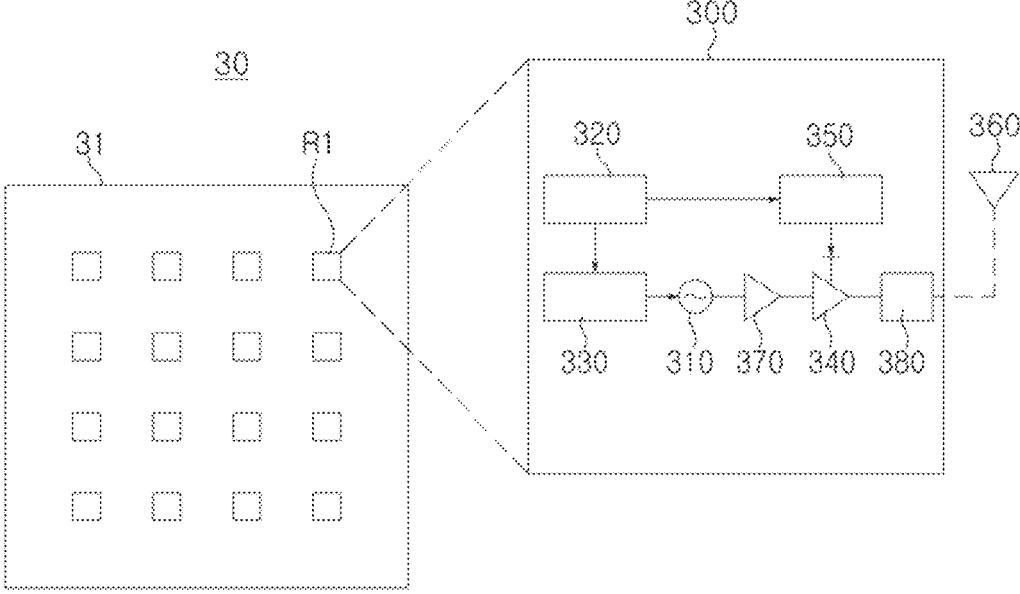

FIGS. 7A and 7B are views illustrating a wireless power transmitting system according to an example embodiment of the present disclosure.

Referring to FIG. 7A, a wireless power transmitting system 30 may include a substrate 31 and a plurality of antenna elements 360 exposed onto a front portion of the substrate 31. The plurality of antenna elements 360 may form an antenna array having a plurality of rows and a plurality of columns. In an example of FIG. 7A, the plurality of antenna elements 360 may form a 4×4 antenna array. However, the present disclosure is not limited thereto. According to an example embodiment, the plurality of antenna elements 360 may be arranged in various patterns such as a circular pattern and the like.

In the example of FIG. 7A, each of the plurality of antenna elements 360 may be implemented as a patch antenna. However, the present disclosure is not limited thereto, and each of the plurality of antenna elements 360 may be implemented as a dipole antenna, a chip antenna, or the like.

Referring to FIG. 7B, the wireless power transmitting system 30 may include a plurality of regions R1 in which a plurality of wireless power transmitting devices 300 are disposed on a rear surface of the substrate 31. According to an example embodiment, the plurality of regions R1 may overlap a region in which the plurality of antenna elements 360 are disposed.

Each of the wireless power transmitting devices 300 may be connected to the plurality of antenna elements 360 described with reference to FIG. 7A. For example, the wireless power transmitting devices 300 may be connected to the plurality of antenna elements 360 in a one-to-one manner. However, the present disclosure is not limited thereto, and one wireless power transmitting device 300 may be connected to the plurality of antenna elements 360.

Each of the wireless power transmitting devices 300 may include a signal generator 310, a controller 320, a phase modulator 330, a power amplifier 340, and a voltage converter 350, and further include a driving amplifier 370 and a filter 380. The power signal output from the power amplifier 340 may be output through the plurality of antenna elements 360. The signal generator 310, the controller 320, the phase modulator 330, the power amplifier 340, the voltage converter 350, the driving amplifier 370 and the filter 380 may have substantially the same structure as that of the signal generator 110, the controller 120, the phase modulator 130, the power amplifier 140, the voltage converter 150, the driving amplifier 170, and the filter 180 described with reference to FIG. 1.

According to an example embodiment of the present disclosure, a phase and an amplitude of power signals output through the plurality of antenna elements 360 may be individually controlled by the controller 320 included in each of the wireless power transmitting devices 300. Furthermore, the power voltage applied to the power amplifier 340 included in each of the wireless power transmitting devices 300 may be individually controlled by the voltage converter 350. Accordingly, the power efficiency of the wireless power transmitting system 30 may be improved.

The amplitude and the phase of the power signals output by the plurality of antenna elements 360 may be controlled in various manners.

Figure 8A:
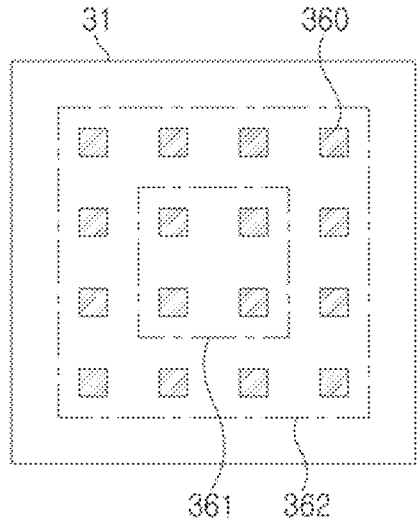
FIGS. 8A and 8B are views illustrating a wireless power transmitting system according to an example embodiment of the present disclosure.
Figure 8B:
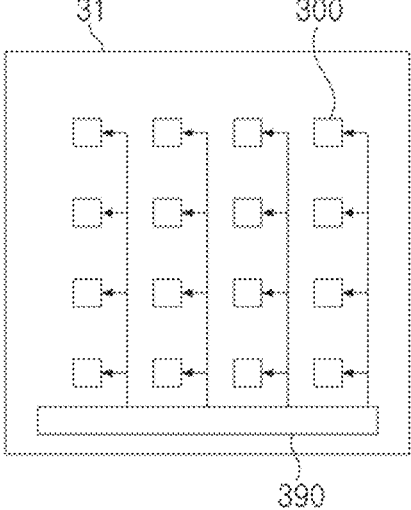

FIGS. 8A and 8B are views illustrating a wireless power transmitting system according to an example embodiment of the present disclosure.

Referring to FIG. 8A, a substrate 31 of a wireless power transmitting system 30 may include a plurality of antenna elements 360. The plurality of antenna elements 360 may include central antenna elements 361 disposed relatively close to a center of the substrate 31, and peripheral antenna elements 362 disposed relatively close to an edge of the substrate 31.

According to an example embodiment of the present disclosure, the wireless power transmitting system 30 may be controlled so that an amplitude of a power signal output by the peripheral antenna elements 362 is lower than an amplitude of a power signal output by the central antenna elements 361. For example, a total power that the wireless power transmitting system 30 may transmit may be limited. Furthermore, as described with reference to FIG. 4, with an increase in the amplitude of the output signal of the wireless power transmitting device 300, the power efficiency of the power amplifier 340 may increase. Accordingly, the wireless power transmitting system 30 may improve the power transmission efficiency of the wireless power transmitting system 30 by allowing the central antenna elements 361 to intensively output a power signal having a higher amplitude.

Referring to FIG. 8B, the wireless power transmitting system 30 may include a plurality of wireless power transmitting devices 300 disposed on a rear surface of the substrate 31, and further include a sensor 390 connected to each of the plurality of wireless power transmitting devices 300. Similarly to the sensor 290 described with reference to FIG. 5, the sensor 390 may sense an amplitude and a phase of a beacon signal received from the wireless power receiving device, and transmit the sensed phase and the sensed amplitude to the plurality of wireless power transmitting devices 300.

For example, the wireless power transmitting system 30 may further include a receiving antenna in addition to the plurality of antenna elements 360. The sensor 390 may receive the beacon signal from the wireless power receiving device using a reception antenna, and may sense an amplitude and a phase of the received beacon signal.

According to an example embodiment of the present disclosure, the sensor 390 may transmit the phase of the received beacon signal to each of the plurality of wireless power transmitting devices 300 to control the wireless power transmitting devices 300 to output a power signal having a time-reversal phase of the beacon signal. Furthermore, the sensor 390 may transmit the amplitude of the received beacon signal to each of the plurality of wireless power transmitting devices 300 to control the amplitudes of the central antenna elements 361 to have a value greater than the amplitudes of the peripheral antenna elements 362.

For example, the sensor 390 may generate a digital signal corresponding to the amplitude and the phase of the received beacon signal, and transmit the digital signal to the plurality of wireless power transmitting devices 300 by using wired communication or wireless communication.

However, the present disclosure is not limited thereto. For example, the amplitude of the plurality of antenna elements 360 may be controlled according to the relative position of the wireless power receiving device for each of the plurality of antenna elements 360.

For example, the sensor 390 may sense an amplitude and a phase of each of a plurality of beacon signals received from the plurality of antenna elements 360. Furthermore, the sensed amplitude and the sensed phase may be transmitted to the plurality of wireless power transmitting devices 300 connected to each of the plurality of antenna elements 360.

The amplitude and phase of each of the plurality of beacon signals may vary due to the relative position of the wireless power transmitting system 30 and the wireless power receiving device(s). Each of the plurality of wireless power transmitting devices 300 may control an amplitude and a phase of a power signal output from each of the plurality of antenna elements 360 based on different amplitudes and phases of the beacon signal. For example, each of the plurality of wireless power transmitting devices 300 may control the amplitude of the power signal to have a large value as the amplitude of the beacon signal increase, thereby more efficiently transmitting limited power to the receiving device.

According to an example embodiment, the sensor 390 may be included in each of the plurality of wireless power transmitting devices 300.

According to an example embodiment, the plurality of wireless power transmitting devices 300 may control the phase of the power signal to have a time-reversal phase of the received beacon signal. When the power signal has the time-reversal phase of the beacon signal, the power signal may satisfy a condition of constructive interference in a position of the wireless power receiving device, the power signal may be transmitted to the wireless power receiving device with high efficiency.

According to an example embodiment of the present disclosure, since complexity of the plurality of wireless power transmitting devices included in the wireless power transmitting system can be reduced, production costs of the wireless power transmitting system may be reduced, and the power efficiency may be improved.

Furthermore, the power voltage of a plurality of power amplifiers may be individually controlled according to the target amplitude of the power signal output from each of the plurality of antenna elements included in the wireless power transmitting system, thereby further improving the power efficiency for transmitting a power signal.

At least one of the components, elements, modules, units, or the like (collectively "components" in this paragraph) represented by a block or an equivalent indication (collectively "block") in the above embodiments including the drawings, for example, the signal generator, the controller, the phase modulator, the power amplifier, the voltage converter, the driving amplifier, the filter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may be driven by software and/or firmware (configured to perform the functions or operations described herein) stored in one or more internal or external memories. Each block of the embodiments may be physically separated into two or more interacting and discrete blocks. Likewise, the blocks of the embodiments may be physically combined into more complex blocks.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

What is claimed is:

1. A wireless power transmitting device comprising:
a signal generator configured to generate an initial signal;
a controller configured to output an amplitude control signal and a phase control signal;
a phase modulator configured to generate a phase-modulated signal by modulating a phase of the initial signal based on the phase control signal;
a power amplifier configured to generate a power signal by amplifying the phase-modulated signal;
a voltage converter configured to control a magnitude of a power voltage of the power amplifier based on the amplitude control signal; and
an antenna configured to externally output the power signal,
wherein the power amplifier is further configured to control an amplitude of the power signal based on the magnitude of the power voltage and a separately settable gain of the power amplifier, and
wherein the controller is further configured to output the amplitude control signal to adjust the magnitude of the power voltage such that a power efficiency of the power amplifier is maximized with respect to a target amplitude of the power signal.

2. The wireless power transmitting device of claim 1, wherein the controller is further configured to output the amplitude control signal so that the target amplitude of the power signal is equal to a maximum amplitude of an output signal of the power amplifier.

3. The wireless power transmitting device of claim 1, wherein the amplitude control signal has a direct current voltage, and
wherein the voltage converter is further configured to control the magnitude of the power voltage to be proportional to the amplitude control signal.

4. The wireless power transmitting device of claim 1, wherein the voltage converter comprises at least one of a variable direct current-to-direct current converter, an analog low-dropout (LDO) regulator, and a digital LDO regulator.

5. The wireless power transmitting device of claim 1, wherein the phase control signal comprises an analog signal or a digital signal, and
wherein the phase modulator is further configured to determine a phase offset based on the phase control signal and to modulate the phase of the initial signal based on the phase offset.

6. The wireless power transmitting device of claim 1, further comprising:
a driving amplifier connected between an output terminal of the signal generator and an input terminal of the power amplifier.

7. The wireless power transmitting device of claim 1, further comprising:
a filter connected between an output terminal of the power amplifier and an input terminal of the antenna.

8. The wireless power transmitting device of claim 1, wherein the initial signal is a radio frequency signal.

9. A wireless power transmitting device comprising:
a signal generator for generating an initial signal;
a sensor configured to sense a phase and an amplitude of a beacon signal from a wireless power receiving device;
a controller configured to output an amplitude control signal and a phase control signal based on the phase and the amplitude of the beacon signal;
a phase modulator configured to generate a phase-modulated signal by modulating a phase of the initial signal based on the phase control signal;
a power amplifier configured to generate a power signal by amplifying the phase-modulated signal;
a voltage converter configured to control a magnitude of a power voltage of the power amplifier based on the amplitude control signal; and
one or more antennas configured to receive the beacon signal and to transmit the power signal to the wireless power receiving device,
wherein the power amplifier is further configured to control an amplitude of the power signal based on the magnitude of the power voltage and a separately settable gain of the power amplifier, and
wherein the controller is further configured to output the amplitude control signal to adjust the magnitude of the power voltage such that a power efficiency of the power amplifier is maximized with respect to a target amplitude of the power signal.

10. The wireless power transmitting device of claim 9, wherein the controller is further configured to, based on the phase of the beacon signal, output the phase control signal so that the power signal has a time-reversed phase relative to the phase of the beacon signal.

11. The wireless power transmitting device of claim 9, wherein the one or more antennas comprise:
a first antenna configured to receive the beacon signal; and
a second antenna configured to transmit the power signal.

12. A wireless power transmitting system comprising:

an antenna array comprising a plurality of antenna elements each respectively configured to output a power signal; and a plurality of wireless power transmitting devices connected to each of the plurality of antenna elements, wherein each of the plurality of wireless power transmitting devices comprises:

a signal generator configured to generate an initial signal;

a controller configured to output an amplitude control signal and a phase control signal;

a phase modulator configured to generate a phase-modulated signal by modulating a phase of the initial signal based on the phase control signal;

a power amplifier configured to generate the power signal by amplifying the phase-modulated signal; and a voltage converter configured to control a magnitude of a power voltage of the power amplifier based on the amplitude control signal, wherein, for each of the plurality of wireless power transmitting devices, the power amplifier is further configured to control an amplitude of the power signal based on the magnitude of the power voltage and a separately settable gain of the power amplifier, and wherein, for each of the plurality of wireless power transmitting devices, the controller is further configured to output the amplitude control signal to adjust the magnitude of the power voltage such that a power efficiency of the power amplifier is maximized with respect to a target amplitude of the power signal.

13. The wireless power transmitting system of claim 12, wherein the wireless power transmitting system further comprises:

a sensor configured to sense a phase and an amplitude of a beacon signal from a wireless power receiving device.

14. The wireless power transmitting system of claim 13, wherein each of the plurality of antenna elements is further configured to receive the beacon signal.

15. The wireless power transmitting system of claim 13, wherein the antenna array further comprises a receiving antenna configured to receive the beacon signal.

16. The wireless power transmitting system of claim 13, wherein the plurality of antenna elements comprises one or more central antenna elements and one or more peripheral antenna elements, and wherein the sensor is further configured to cause the one or more central antenna elements to output a power signal having a larger amplitude than a power signal output by the one or more peripheral antenna elements.

17. The wireless power transmitting system of claim 13, wherein the sensor is further configured to transmit a control signal according to a sensing result to each of the plurality of wireless power transmitting devices.

18. The wireless power transmitting system of claim 12, wherein the plurality of antenna elements comprise at least one of a patch antenna, a dipole antenna, and a chip antenna.

19. The wireless power transmitting system of claim 12, further comprising a substrate, the substrate comprising:

a front portion on which the plurality of antenna elements are arranged, and a rear portion on which the plurality of wireless power transmitting devices are arranged.

* * * * *